United States Patent
Hirano

(10) Patent No.: US 7,210,757 B2
(45) Date of Patent: May 1, 2007

(54) IMAGE PROCESSING METHOD AND APPARATUS, IMAGE FORMING APPARATUS AND SYSTEM, PROGRAM AND RECORDING MEDIUM

(75) Inventor: Masanori Hirano, Kanagawa (JP)

(73) Assignee: Ricoh Compnay, Ltd., Tokyo (JP)

( * ) Notice: Subject to any disclaimer, the term of this patent is extended or adjusted under 35 U.S.C. 154(b) by 81 days.

(21) Appl. No.: 10/543,512

(22) PCT Filed: Nov. 30, 2004

(86) PCT No.: PCT/JP2004/018100

§ 371 (c)(1),
(2), (4) Date: Jul. 26, 2005

(87) PCT Pub. No.: WO2005/057911

PCT Pub. Date: Jun. 23, 2005

(65) Prior Publication Data

US 2006/0103688 A1    May 18, 2006

(30) Foreign Application Priority Data

Dec. 8, 2003   (JP) ............................ 2003-408439

(51) Int. Cl.
*B41J 2/205* (2006.01)
*G06K 1/00* (2006.01)
(52) U.S. Cl. ..................... 347/15; 358/1.9; 358/3.01
(58) Field of Classification Search ................ 347/15; 358/1.2, 1.9, 3.01, 3.06, 3.03, 3.13
See application file for complete search history.

(56) References Cited

U.S. PATENT DOCUMENTS 5,504,843 A * 4/1996 Catapano et al. .......... 358/1.16
5,710,640 A * 1/1998 Suzuki ...................... 358/461

FOREIGN PATENT DOCUMENTS

| JP | 7-220070 | 8/1995 |
|---|---|---|
| JP | 9-248921 | 9/1997 |
| JP | 2000-108384 | 4/2000 |
| JP | 2001-45308 | 2/2001 |
| JP | 2001-144958 | 5/2001 |
| JP | 2001-285630 | 10/2001 |
| JP | 2001-352453 | 12/2001 |
| JP | 2002-10090 | 1/2002 |
| JP | 2002-281302 | 9/2002 |

* cited by examiner

*Primary Examiner*—Lamson Nguyen
(74) *Attorney, Agent, or Firm*—Cooper & Dunham LLP

(57) ABSTRACT

Recording data is produced from first image data corresponding to each pixel with a first number of gradations so as to supplied to a recording apparatus, which expresses each pixel with a number of gradations smaller than the first number of gradations. Second image data is produced by converting the first image data into a color space that can be output by the recording apparatus. Third image data is produced based on a second number of gradations of the second image data so that the third image data has a third number of gradations. The recording data is produced by applying a halftone process to the third image data. The third number of gradations of the third image data is adjusted to be equal to or larger than the second number of gradations of the second image data in accordance with a number of colors for each pixel used in the second image data.

36 Claims, 11 Drawing Sheets

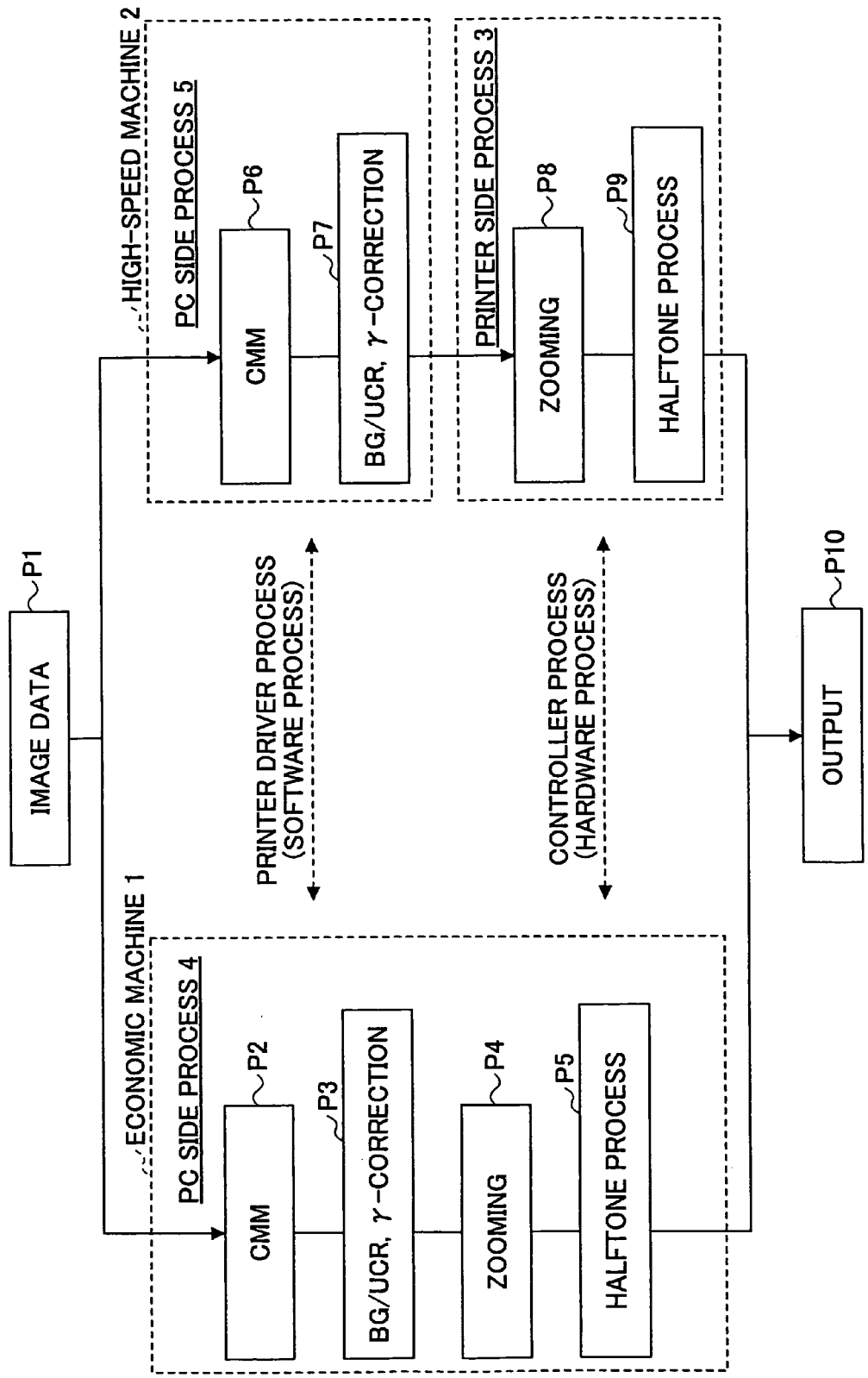

INK INJECTION NOZZELE

DOT RECORDED ON RECORDING PAPER

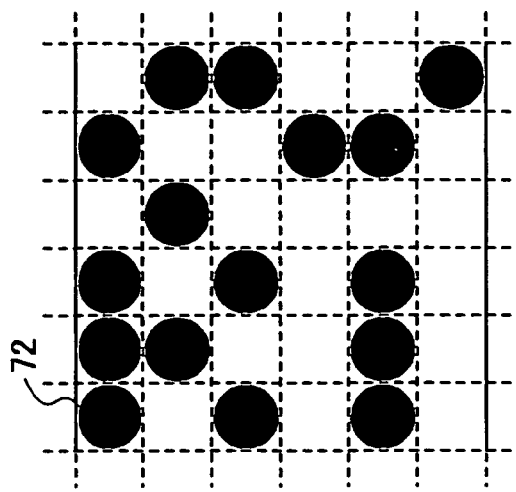

BINARIZE
PROCESS

LESS VALUE
PROCESS
(BRIGHTNESS
MODULATION)

LESS VALUE
PROCESS
(DOT SIZE
MODULATION)

MINIMUM DOT SIZE IS SMALL

MINIMUM DOT SIZE IS LARGE

IMAGE PROCESSING METHOD AND APPARATUS, IMAGE FORMING APPARATUS AND SYSTEM, PROGRAM AND RECORDING MEDIUM

TECHNICAL FIELD

The present invention generally relates to image data processing techniques and, more particularly, to image processing method and apparatus suitable for image forming apparatuses and systems which apply a halftone process to image data.

BACKGROUND ART

As a recording apparatus, which prints an image processed by a computer in multicolor and multi-tone (gradation), there is known an inkjet printer (hereinafter, referred to as an IJ printer) which records (forms) an image (also referred to as a dot image) on a recording paper as a recording medium by injecting ink droplets from nozzles provided to a recording head onto the recording paper. Means for generating energy to inject ink droplets in the IJ printer is generally classified into two methods, one being a so-called bubble jet® method (hereinafter, referred to as a BJ method) and the other being a so-called piezo method (hereinafter, referred to as a PZT type).

The BJ method propels droplets of ink by rapidly heating the ink filled in a pressurizing liquid chamber by utilizing a volume change by film boiling. The PZT method propels droplets of ink by a pressure due to a volume change generated by deforming a diaphragm constituting a part of a pressurizing liquid chamber by displacement of a piezoelectric element. Accordingly, although the pressurization of ink is different between the BJ method and the PZT method, there is no difference in the recording process to form a dot image by injecting ink droplets.

In the meantime, in order to output image data generated by a computer or acquired from an image input apparatus such as a digital camera or a scanner from the IJ printer, various processes must be applied to the image data. Generally, a process flow of image processing is such as shown in FIG. 1.

FIG. 1 is a flowchart of a process of converting input image data into data, which can output by a recording apparatus. In FIG. 1, CMM conversion processes P2 and P6 convert a color system (RGB) of image data P1, which is input as first image data, into a color system (CMY) of an output apparatus such as an IJ printer. BG/UCR processes P3 and P7 separate a black (K) component from the CMY data so as to generate second image data. γ-correction processes P3 and P7 adjust the output balance of each color component separated from the CMY data. Zooming processes P4 and P8 enlarge or reduce the image data so as to match the image data to an output resolution of the IJ printer. Halftone processes P4 and P8 compare each pixel in the enlarged image data with a threshold matrix so as to convert the image data into dot pattern data. An output process P10 outputs the dot image data as third image data.

Usually, image data sent from a personal computer PC has an amount of information with 8 bits for each color RGB per one pixel. Such an amount of information enables expression of 256 gradations from 0 to 255 for each color component.

However, all 256 gradations cannot be used in practice. Since output characteristic of each color component, cyan (C), magenta (M), yellow (Y) and black (K) is dependent on coloring materials used in ink, an injection characteristic of ink droplets and characteristics of recording medium (recording papers), ideal output characteristics cannot be always acquired. Although the γ-correction processes P3 and P7 are applied so as to correct the output characteristics, the γ-correction may cause a lack of gradations mentioned below.

FIGS. 2A through 2F are graphs for explaining a lack of gradations due to a gamma-correction and avoidance of such a lack by an expansion of a gradation level. In FIGS. 2A through 2F, a horizontal axis represents an input tone (input gradation) and a vertical axis represents an output tone (output gradation). FIG. 2D is an enlarged view of a part indicated by a circle in FIG. 2C. FIG. 2F is an enlarged view of a part indicated by a circle in FIG. 2E. FIG. 2A shows a state where no correction is applied and an input and an output correspond to each other on one-to-one basis. On the other hand, since a nonlinear correction as shown in FIG. 2B is usually applied, a lack of gradations as shown in FIG. 2D, which is a partial enlarged view of FIG. 2C, may occur after the correction.

In order to solve such a problem of lacking in gradations, Japanese Laid-Open Patent Applications No. 2001-45308 and No. 2001-285630 suggest a process being performed after enlarging the data input to the CMM process into gradation data of more than 8 bits. Moreover, Japanese Laid-Open Paten Applications No. 2000-108384 and No. 2001-144958 suggest an expansion of a number of gradations with respect to data after the CMM correction. This treatment is to reflect a part, which is eliminated as a value less than a decimal in 8-bit data, as a gradation level.

FIGS. 2C and 2D show the lack of gradations, and FIG. 2E and 2F show an aspect in which the part of lacking gradations (shown in FIGS. 2C and 2D) is not eliminated and is reflected in the corrected data by the expansion of a number of gradations.

Thus, it is possible to avoid an occurrence of lacking gradations due to a gamma-correction by performing an expansion of a gradation level as mentioned above. However, it is natural that an expansion of a gradation level causes an increase in an amount of information. If an amount of information to handle is increased, a capacity of a buffer for operation must be increased. There may be a case where a expansion of a gradation level causes not only a decrease in a processing speed due to an increase in an amount of operation but also a cost increase due to an increase in a buffer capacity.

In recent IJ printers, a number of nozzles mounted on one head unit tends to be increased so as to acquire both a high-resolution and a high-speed operation. Especially, in a BJ printer that is capable of being applied with a photolithography technique, a head having more than 20 nozzles has become popular. Although such an increase in a number of nozzles is to avoid, by increasing the number of nozzles, a problem in that a recording width per a unit number of nozzles is decreased due to a decrease in a nozzle pitch to acquire a high-resolution, an amount of information to be sent to a head at once is increased by an amount corresponding the a number of nozzles increased.

Further, since it is necessary to increase a resolution not only in a sub-scanning direction, which is a direction of adding nozzles, but also in a main scanning direction, an amount of data required for one scan of a head is increased as a square times of the number of nozzles. In association with an increase in an amount of operation in an image processing apparatus due to an increase in resolution, a time lag may be generated between a scan timing of a head and a time of completion of transfer of data to a head unit. In such a case, the operation of the head unit is stopped until necessary data is received, which results in deterioration in effects of the increase in the number of nozzles.

DISCLOSURE OF INVENTION

It is a general object of the present invention to provide an improved and useful image processing technique in which the above-mentioned problems are eliminated.

A more specific object of the present invention is to provide an image processing method and apparatus which can reduce a decrease in processing speed while improving reproducibility of gradations by an expansion of a number of gradations.

In order to achieve the above-mentioned objects, there is provided according to one aspect of the present invention an image processing method for producing recording data from first image data corresponding to each pixel with a first number of gradations so as to supply the recording data to a recording apparatus, which expresses each pixel with a number of gradations smaller than the first number of gradations, the image processing method comprising: producing second image data by converting the first image data into a color space that can be output by the recording apparatus, the second image data having a second number of gradations; producing third image data based on the second number of gradations of the second image data so that the third image data has a third number of gradations; and producing the recording data by applying a halftone process to the third image data, wherein producing the third image data includes adjusting the third number of gradations of the third image data to be equal to or larger than the second number of gradations of the second image data in accordance with a number of colors for each pixel used in the second image data.

Specifically, the present invention suppresses an unnecessary increase in gradations by adjusting a level of a gradation expansion in accordance with a number of colors used for each pixel in input image data so as to reduce an amount of information to be processed. More specifically, by adjusting a number of gradations so as to be slightly increased or maintained, when producing the third image data, in accordance with a number of colors used for each pixel of the second image data produced, a number of output gradations does not become equal to zero even if a number of gradations of the first image data is a value close to zero. Therefore, a decrease in processing speed is suppressed while improving gradation reproducibility by an expansion of a number of gradations.

In the image processing method according to the present invention, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, producing the third image data may include adjusting the third number of gradations of the third image data so as to satisfy a relationship "a number of gradations of the primary color≦a number of gradations of the secondary color≦a number of gradations of the tertiary color". When the primary color is used in the second image data, producing the third image data may not increase the third number of gradations so that the second number of gradations of the second image data is equal to the third number of gradations of the third image data.

In the image processing method according to the present invention, when colors used in the second image data are in a one-color phase system having different brightness, when the colors used in the second image data are in a two-color phase system, and when the colors used in the second image data are in a three-color phase system, producing the third image data may include adjusting the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system". When the colors in the one-color phase system are used in the second image data, producing the third image data may not increase the third number of gradations so that the second number of gradations of the second image data is equal to the third number of gradations of the third image data.

In the image processing method according to the present invention, producing the third image data may include adjusting a rate of increase in the third number of gradations in accordance with kinds of recording media on which the third image data is recorded. Additionally, producing the third image data may include adjusting a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

Additionally, there is provided according to another aspect of the present invention a recording medium storing a program for causing a computer to perform an image processing method for producing recording data from first image data corresponding to each pixel with a first number of gradations so as to supply the recording data to a recording apparatus, which expresses each pixel with a number of gradations smaller than the first number of gradations, the image processing method comprising: producing second image data by converting the first image data into a color space that can be output by the recording apparatus, the second image data having a second number of gradations; producing third image data based on the second number of gradations of the second image data so that the third image data has a third number of gradations; and producing the recording data by applying a halftone process to the third image data, wherein producing the third image data includes adjusting the third number of gradations of the third image data to be equal to or larger than the second number of gradations of the second image data in accordance with a number of colors for each pixel used in the second image data.

In the recording medium according to the present invention, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, producing the third image data may include adjusting the third number of gradations of the third image data so as to satisfy a relationship "a number of gradations of the primary color≦a number of gradations of the secondary color≦a number of gradations of the tertiary color". When the primary color is used in the second image data, producing the third image data may not increase the third number of gradations so that the second number of gradations of the second image data is equal to the third number of gradations of the third image data.

In the recording medium according to the present invention, when colors used in the second image data are in a one-color phase system having different brightness, when the colors used in the second image data are in a two-color phase system, and when the colors used in the second image data are in a three-color phase system, producing the third image data may include adjusting the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system". When the colors in the one-color phase system are used in the second image data, producing the third image data may not increase the third number of gradations so that the second number of gradations of the second image data is equal to the third number of gradations of the third image data.

In the recording medium according to the present invention, producing the third image data may include adjusting a rate of increase in the third number of gradations in accordance with kinds of recording media on which the third image data is recorded. Additionally, producing the third image data may include adjusting a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

Additionally, there is provided according to another aspect of the present invention an image forming apparatus for producing recording data from first image data corresponding to each pixel with a first number of gradations so as to supply the recording data to a recording part, which expresses each pixel with a number of gradations smaller than the first number of gradations, the image forming apparatus comprising: control means for producing second image data by converting the first image data into a color space that can be output by the recording apparatus, the second image data having a second number of gradations; producing third image data based on the second number of gradations of the second image data so that the third image data has a third number of gradations; and producing the recording data by applying a halftone process to the third image data, wherein the control means adjusts the third number of gradations of the third image data to be equal to or larger than the second number of gradations of the second image data in accordance with a number of colors for each pixel used in the second image data.

In the image forming apparatus according to the present invention, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, the control means may adjust the third number of gradations of the third image data so as to satisfy a relationship "a number of gradations of the primary color≦a number of gradations of the secondary color≦a number of gradations of the tertiary color". When the primary color is used in the second image data, the control means may not increase the third number of gradations so that the second number of gradations of the second image data is equal to the third number of gradations of the third image data.

In the image forming apparatus according to the present invention, when colors used in the second image data are in a one-color phase system having different brightness, when the colors used in the second image data are in a two-color phase system, and when the colors used in the second image data are in a three-color phase system, the control means may adjust the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system". When the colors in the one-color phase system are used in the second image data, the control means may not increase the third number of gradations so that the second number of gradations of the second image data is equal to the third number of gradations of the third image data.

In the image forming apparatus according to the present invention, the control means may adjust a rate of increase in the third number of gradations in accordance with kinds of recording media on which the third image data is recorded. The control means may adjust a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

In the image forming apparatus according to the present invention, the control means may perform a zooming process and a halftone process.

Additionally, there is provided according to another aspect of the present invention an image forming system comprising: an image processing apparatus that produces recording data from first image data corresponding to each pixel with a first number of gradations so as to supply the recording data to a recording part, which expresses each pixel with a number of gradations smaller than the first number of gradations; an image forming apparatus that performs a zooming process and a halftone process to the recording data supplied by the image processing apparatus so as to produce an image corresponding to the recording data; and control means for producing second image data by converting the first image data into a color space that can be output by the recording apparatus, the second image data having a second number of gradations; and producing third image data based on the second number of gradations of the second image data so that the third image data has a third number of gradations; and producing the recording data by applying a halftone process to the third image data, wherein the control means adjusts the third number of gradations of the third image data to be equal to or larger than the second number of gradations of the second image data in accordance with a number of colors for each pixel used in the second image data.

In the image forming system according to the present invention, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, the control means may adjust the third number of gradations of the third image data so as to satisfy a relationship "a number of gradations of the primary color≦a number of gradations of the secondary color≦a number of gradations of the tertiary color". When the primary color is used in the second image data, the control means may not increase the third number of gradations so that the second number of gradations of the second image data is equal to the third number of gradations of the third image data.

In the image forming system according to the present invention, when colors used in the second image data are in a one-color phase system having different brightness, when the colors used in the second image data are in a two-color phase system, and when the colors used in the second image data are in a three-color phase system, the control means adjusts the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system". When the colors in the one-color phase system are used in the second image data, the control means may not increase the third number of gradations so that the second number of gradations of the second image data is equal to the third number of gradations of the third image data.

In the image forming system according to the present invention, the control means may adjust a rate of increase in the third number of gradations in accordance with kinds of recording media on which the third image data is recorded. The control means may adjust a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

Additionally, there is provided according to another aspect of the present invention a program for causing a computer to perform an image processing method for producing recording data from first image data corresponding to each pixel with a first number of gradations so as to supply the recording data to a recording apparatus, which expresses each pixel with a number of gradations smaller than the first number of gradations, the image processing method comprising: producing second image data by converting the first image data into a color space that can be output by the recording apparatus, the second image data having a second number of gradations; producing third image data based on the second number of gradations of the second image data so that the third image data has a third number of gradations; and producing the recording data by applying a halftone process to the third image data, wherein producing the third image data includes adjusting the third number of gradations of the third image data to be equal to or larger than the second number of gradations of the second image data in accordance with a number of colors for each pixel used in the second image data.

In the program according to the present invention, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, producing the third image data may include adjusting the third number of gradations of the third image data so as to satisfy a relationship "a number of gradations of the primary color≦a number of gradations of the secondary color≦a number of gradations of the tertiary color". When the primary color is used in the second image data, producing the third image data does not increase the third number of gradations so that the second number of gradations of the second image data is equal to the third number of gradations of the third image data.

In the program according to the present invention, when colors used in the second image data are in a one-color phase system having different brightness, when the colors used in the second image data are in a two-color phase system, and when the colors used in the second image data are in a three-color phase system, producing the third image data may include adjusting the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system". When the colors in the one-color phase system are used in the second image data, producing the third image data may not increase the third number of gradations so that the second number of gradations of the second image data is equal to the third number of gradations of the third image data.

In the program according to the present invention, producing the third image data may include adjusting a rate of increase in the third number of gradations in accordance with kinds of recording media on which the third image data is recorded.

In the program according to the present invention, producing the third image data may include adjusting a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

Other objects, features and advantages of the present invention will become more apparent from the following detailed descriptions when read in conjunction with the accompanying drawings.

BRIEF DESCRIPTION OF DRAWINGS

FIG. 1 is a flowchart of a process of converting input image data into data, which can output by a recording apparatus;

FIGS. 7A through 7C are illustrations for explaining a Dither method, which is a typical method to replace gradation data with ON/OFF of dots;

BEST MODE FOR CARRYING OUT THE INVENTION

A description will now be given, with reference to the drawings, of an embodiment of the present invention.

Figure 3A:
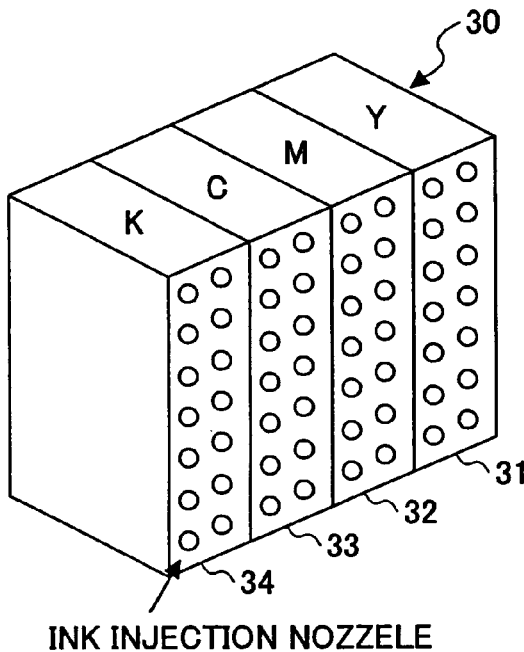
FIG. 3A is a perspective view of an inkjet head of an inkjet printer.
Figure 3B:
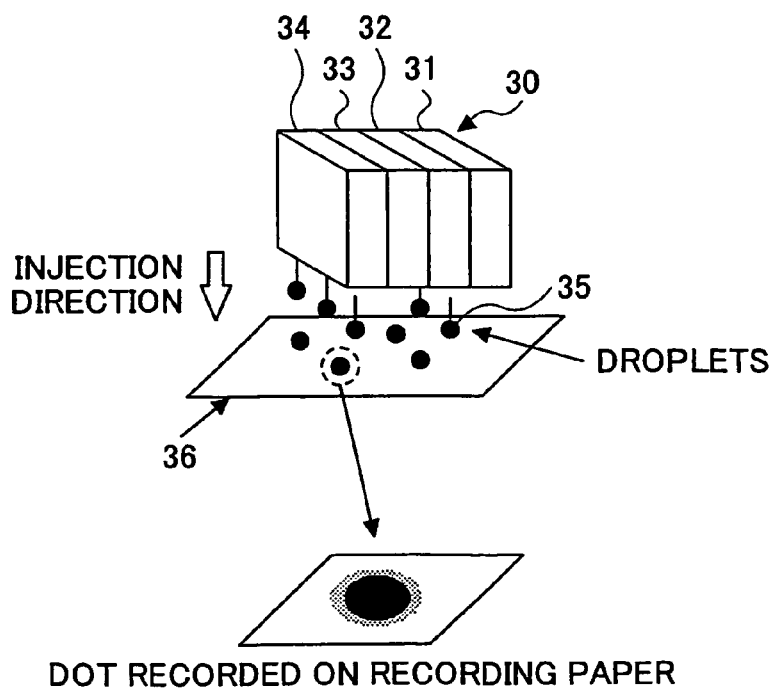
FIG. 3B is an illustration for explaining an operation of the inkjet head shown in FIG. 3A.

FIG. 3A is a perspective view of an inkjet head of an inkjet (IJ) printer. FIG. 3B is an illustration for explaining an operation of the inkjet head shown in FIG. 3A. As shown in this FIG. 3A, the inkjet head 30 comprises a head unit 31 (yellow Y), a head unit 32 (magenta M), a head unit 33 (cyan C) and a head unit 34 (black K). As shown in FIG. 3B, the inkjet head 30 injects ink droplets from ink nozzles provided to each of the head units 31 to 34 onto a recording paper 36 so as to record an image on the recording paper 36.

It should be noted that although the head units 31 to 34 corresponding to four color components of CMYK are shown in the figures, there are developed recently an inkjet head having an additional head unit corresponding to light ink such as light cyan (or photo cyan), which is brighter than conventional cyan, light magenta (or photo magenta), which is brighter than conventional magenta, or the like, or dark ink which is darker than conventional ink.

Figure 4:
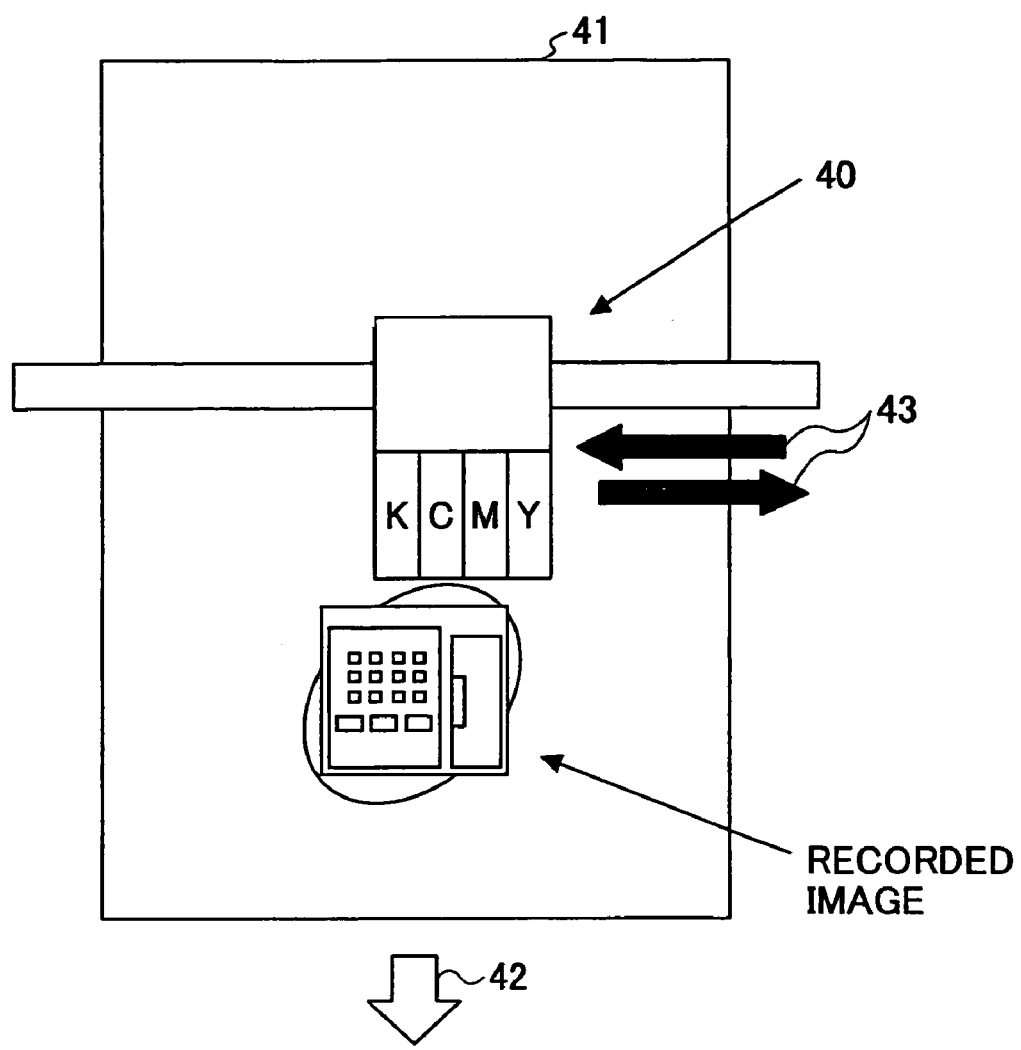
FIG. 4 is an illustration showing a movement of the inkjet head and a movement of a recording paper associated with a recording operation.

FIG. 4 is an illustration showing a movement of the IJ head and a movement of a recording paper associated with a recording operation. Although some IJ printers are equipped with a line head that covers an entire width of a recording paper, a generally used IJ printer has a recording head 40 having the head units 31 to 34 shown in FIGS. 3A and 3B. The recording head 40 records an image on a recording paper 41 by injecting ink droplets onto the recording paper 41 while moving in a direction (main scanning direction: indicated by arrows 43) perpendicular to a feed direction (sub-scanning direction: indicated by an arrow 42).

The IJ printer performs a color reproduction according to a subtractive color mixing method using CMYK (including light ink and dark ink). Image data input from a computer C and the like to the IJ printer is based on image data according to additive color mixing method using RGB and an amount of information per one pixel is more than 8 bits, which is equal to or larger than an amount of data processible by the IJ printer. Thus, it is necessary to convert the image data from a computer into image data having 1 to 2 bits for each color component of CMYK by applying the process shown in FIG. 1 so that the converted image data can be output by the IJ printer. It should be noted that FIG. 1 shows two process flows, one being a process flow of an economic machine 1 in which the image data is processed by software (printer driver) that operates on a computer (PC side processes 4 and 5) and the printer merely outputs the processed image data, and the other being a process flow of a high-speed machine 2 in which the image processing is shared by software and a processing means mounted on the printer (printer side process 3) so as to achieve high-speed processing.

Moreover, recently, with popularization of digital cameras, there have been available on the market some IJ printers that are capable of outputting an image without using a computer PC by being provided with a reading mechanism, which reads a recording medium having image data, and an image processing mechanism achieved by hardware that performs a process flow of the economic machine 1.

Figure 5:
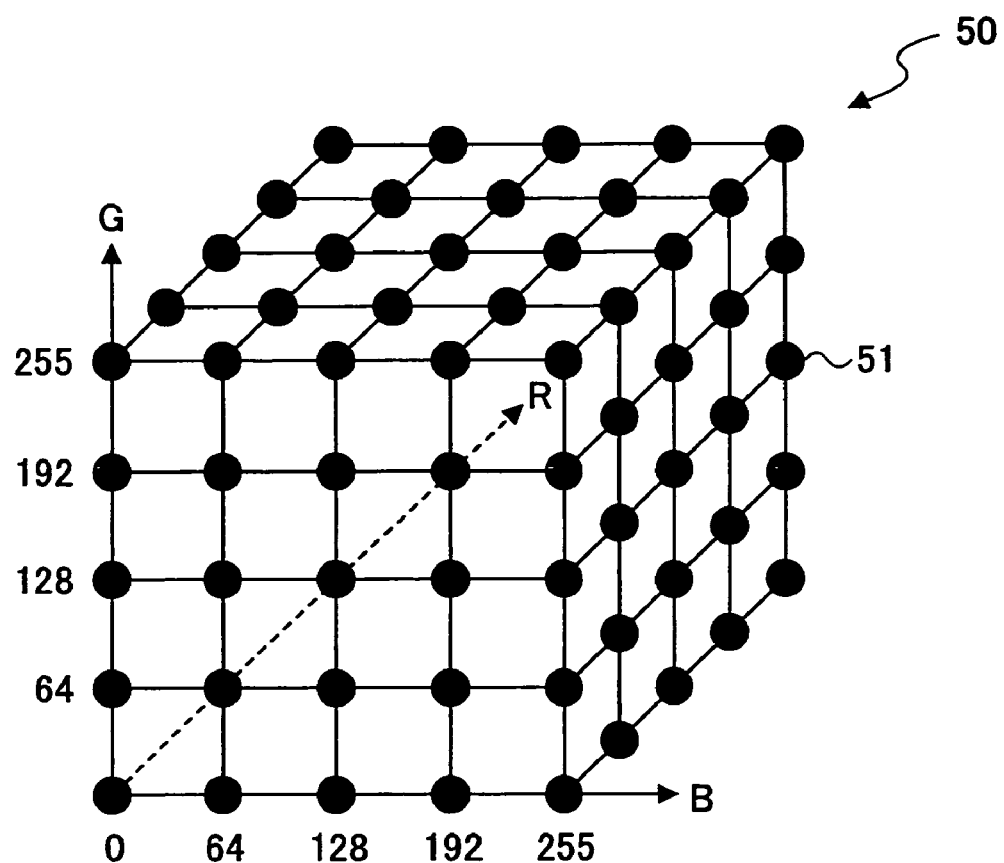
FIG. 5 is an illustration of a cubic lattice for color spatial conversion processing used in a CMM process.

The CMM process P2, from among the processes shown in FIG. 1, performs conversion from the RGB color space into CMYK color space. This process uses a three-dimensional cubic lattice 50 such as shown in FIG. 5 so as to set the input RGB data to a closest lattice point 51 by an interpolation operation and replace the RGB data with CMY data defined at the lattice point 51. It should be noted that FIG. 5 is an illustration of a cubic lattice for color spatial conversion processing used in the CMM process. Although FIG. 5 shows a cubic lattice, other lattices such as a hexagonal prism or a tetrahedron.

The BG/UCR processes P3 and P7 (refer to FIG. 1) produce a K component by replacing overlapping levels in the CMY data with a component of K (black). Since an amount of ink corresponding to three colors, C (cyan), M (magenta) and Y (yellow), can be covered by an amount of ink of one color, there is an effect of reducing an amount of ink consumed. Additionally, there is an effect to add a so-called "thickness" to a dark portion.

Figure 6:
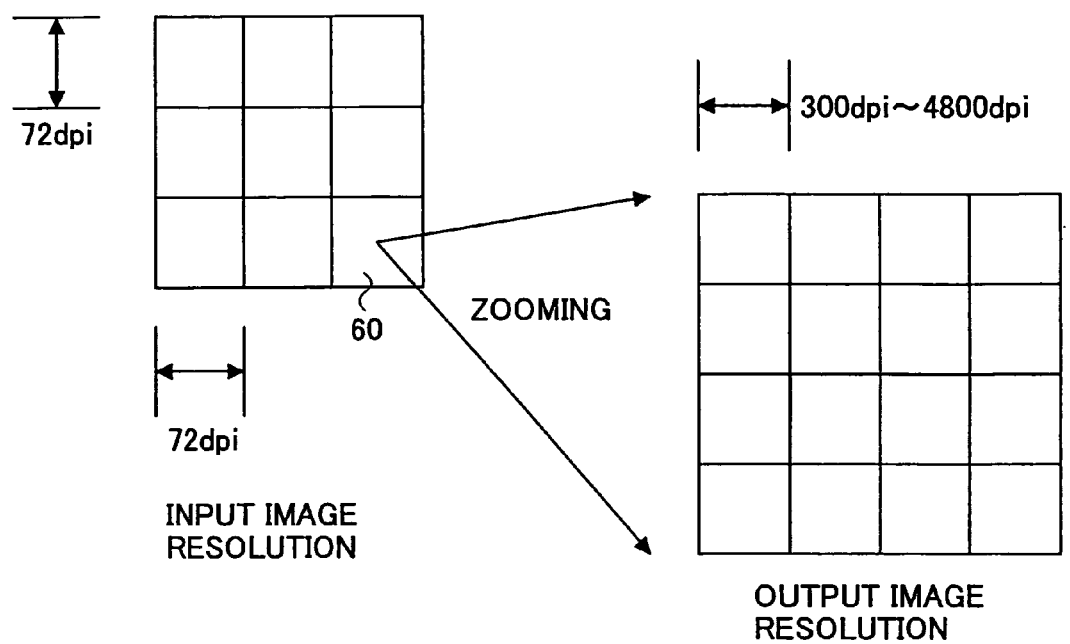
FIG. 6 is an illustration showing a zooming process, which convert one pixel of the input image into an output resolution of a printer.

FIG. 6 is an illustration showing the zooming process, which convert one pixel of the input image into an output resolution of a printer. The zooming processes P4 and P8 replace a resolution (72 dpi) of one pixel 60 of input image data with a resolution (300–4,800 dpi) of the printer, as shown in FIG. 6, so as to substitute the gradations per one pixel 60 by a dot density per unit area, which prevents deterioration of the gradation characteristic.

The halftone processes P5 and P9 (refer to FIG. 1) replaces values of pixels with ON/OFF of dots. Basically, the gradation level of each pixel is compared with a threshold value so as to generate a dot at a position of a pixel having a gradation level exceeding the threshold value and not generate a dot at a position of a pixel having a gradation level below the threshold value, thereby replacing the gradation level with a dot. Generally, as the halftone process, a Dither method using a threshold matrix and an error diffusion method, which reflects an error of quantization in a pixel operation, are popular.

FIGS. 7A through 7C are illustrations for explaining a Dither method, which is a typical method to replace gradation data with ON/OFF of dots. FIGS. 7A through 7C show a gradation expression by one kind of dots with respect to a process using a 4×4 Dither matrix. For example, when processing multi-value image data 70 shown in FIG. 7A, tiling is performed with a Dither matrix (square black frame: 4×4 mask) 71 shown in FIG. 7B. The tiling is a process to determine whether a value of each pixel of multi-value image data is larger or smaller than a threshold value, which is a value of a part corresponding to each pixel in the Dither matrix so as to output a dot 72 when the pixel value is equal to or larger than the threshold value and not output a dot when the pixel value is smaller than the threshold value. By sequentially applying the Dither matrix process shown in FIG. 7A to the multi-value data, an output dot pattern such as shown in FIG. 7C is acquired.

Figure 8A:
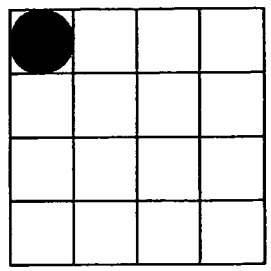
FIGS. 8A through 8I are illustrations showing dot reproduction according to a less value process.
Figure 8B:
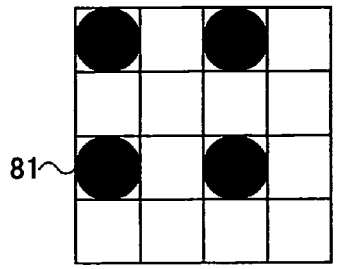
Figure 8C:
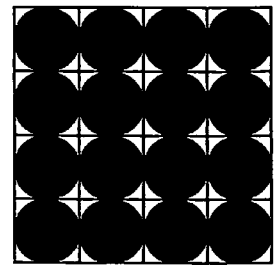
Figure 8D:
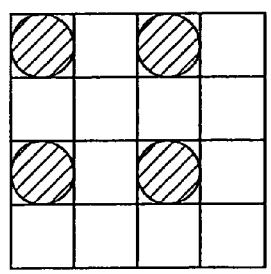
Figure 8E:
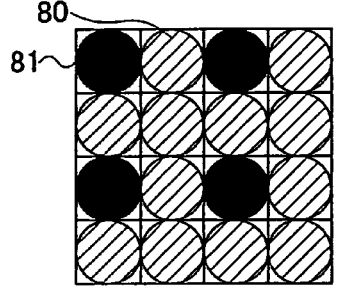
Figure 8F:
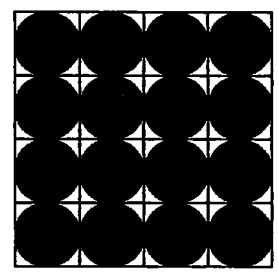
Figure 8G:
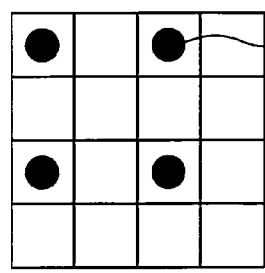
Figure 8H:
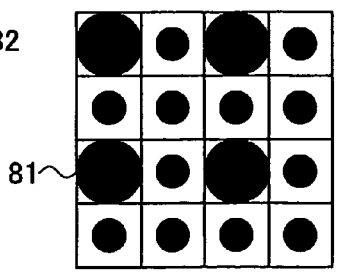
Figure 8I:
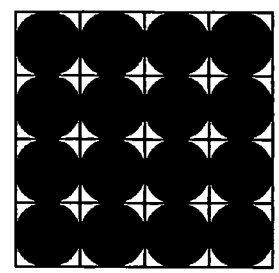

In recent years, in order to improve granular feel in the binarizing process such as shown in FIGS. 7A through 7C or FIGS. 8A through BC, ink (hatched dots 80 and black dots 81) having different brightness are used (a less value process "brightness modulation") as shown in FIGS. 8D through 8F, or smaller dots 82 are added as shown in FIGS. 8G through 8I, so as to improve the gradation reproducibility to 1 bit to 2 bits (a less value process "dot size modulation", referred to as "less value" for the sake of convenience).

It should be noted that FIGS. 8A through 8I are illustrations showing dot reproduction according to a less value process.

The present invention relates to a technique of performing image processing using image data which has been converted into a higher number of gradations than input image data by temporarily expanding a gradation level in a series of image processing. By using the technique, a part to be rounded up (or rounded down) by a decimal level adjustment in the 8-bit process as shown in FIG. 2C can be reproduced as a continuous output as shown in FIGS. 2E and 2F. The extension of the number of gradations itself is performed to be twice, four times, eight times, . . . by shifting the gradation level of each pixel. However, generally, the expanding process is not performed before the CMM process, which takes an extremely large amount of operation, but performed after the CMM process since such an expansion causes an increase in a load to a processor.

The γ-process shown in FIGS. 2E and 2F is an example of a case where an expansion is made from 8 bits to 16 bits. Also in the subsequent halftone process, the dot replacement can be done by being applied with a Dither mask corresponding to 16-bit value or subjected to an error diffusion process. If an amount of information per one pixel increases, a burden to the process is increased, which finally gives influence to a processing speed. In the present invention, an expansion of a gradation level is not performed uniformly, but the expansion of gradation level is suppressed or prohibited in accordance with a number of colors used for each pixel unit so as to increase a processing speed.

Figure 2A:
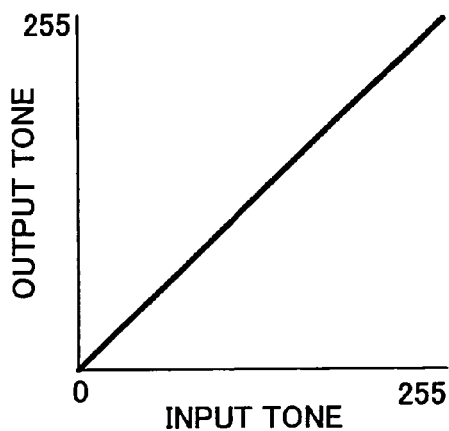
FIGS. 2A through 2F are graphs for explaining a lack of gradations due to a gamma-correction and avoidance of such a lack by an expansion of a gradation level.
Figure 2B:
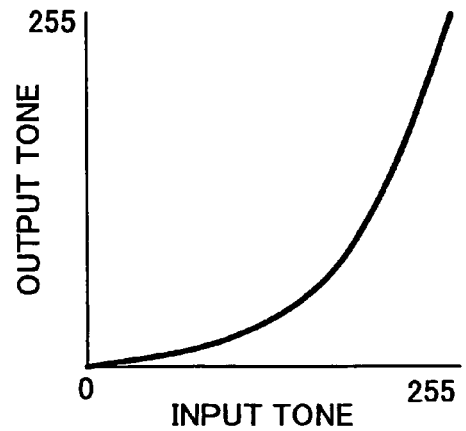
Figure 2C:
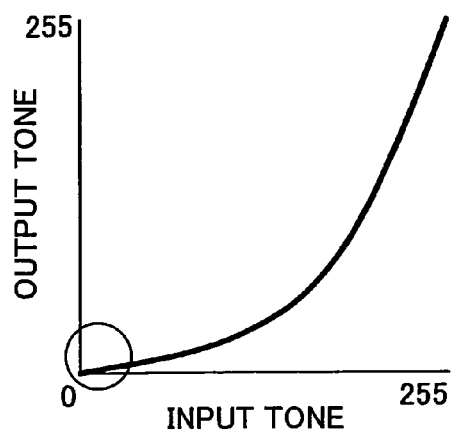
Figure 2D:
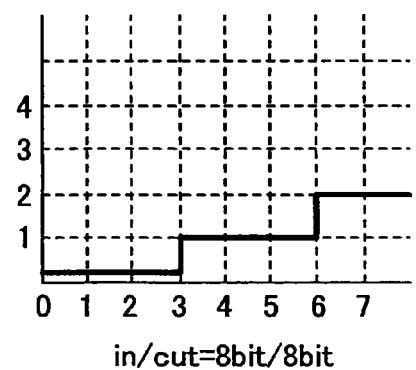
Figure 2E:
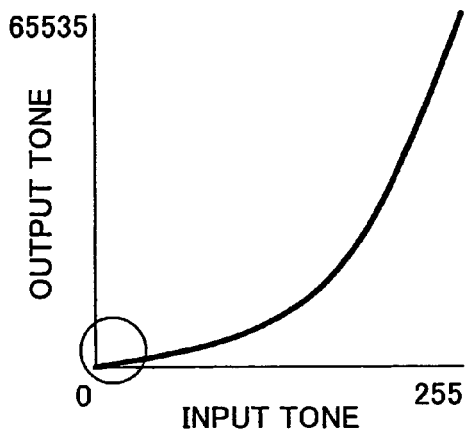
Figure 2F:
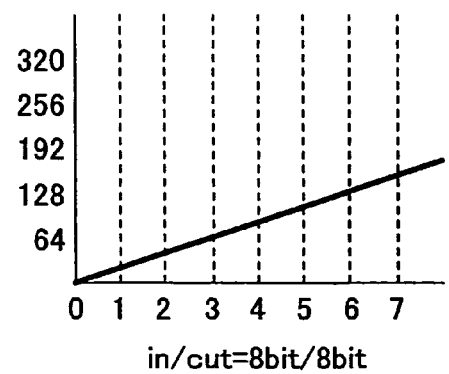

For example, also in 8-bit image data, if it is not the gamma correction curve as shown in FIG. 2B but the correction curve in which a ratio of an input to an output is close to 1:1 as shown in FIG. 2A, the lack of gradation level is minimized. Unless the lack of gradation level concentrates on a part of the gradation section, even if about 10% of 8-bit gradation is missed, a deterioration in an image quality is hardly recognized in practice. Thus, there is no need to perform an expansion of gradation in a single color of CMYK in an image processing system in which an optimization of a halftone process is performed so that a gamma correction in which an input and output characteristic is close to 1:1 has been made.

Figure 9A:
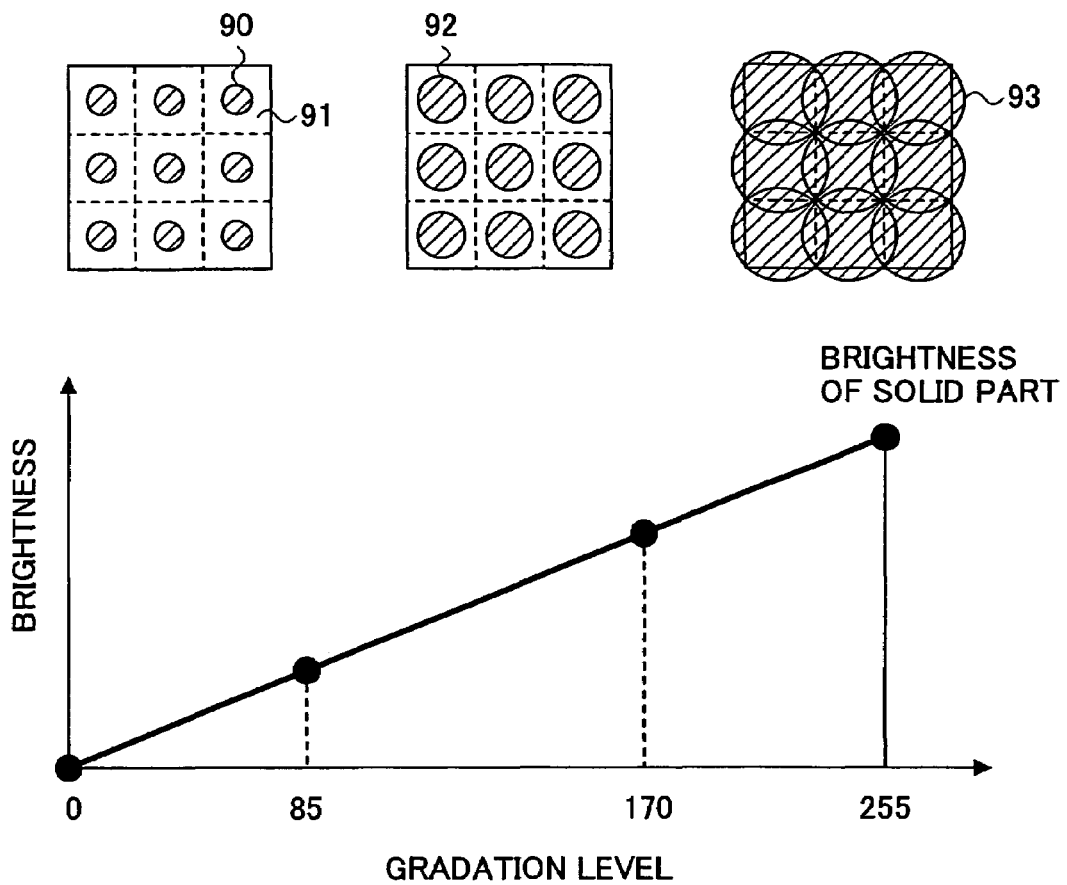
FIGS. 9A through 9C are illustrations showing dot sizes and allocation of gradation reproduction sections in a printer of a dot size modulation type.
Figure 9B:
Figure 9C:
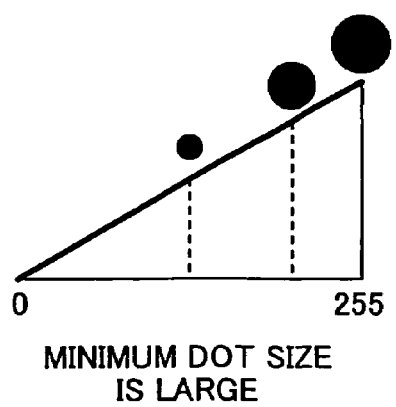

FIGS. 9A through 9C are illustrations showing dot sizes and allocation of gradation reproduction sections in a printer of a dot size modulation type. According to sizes of dots formed as shown in the figures, a width of each gradation section using each dot size is adjusted and reflected in threshold values of a Dither in the halftone process or threshold values in an error diffusion process.

FIG. 9A shows a case where dots having each dot size are formed on a recording paper with ideal sizes. FIG. 9A shows that the gradation expression is achieved by only small dots 90 and blanks 91 in a range of gradation level from 0 to 85; the gradation expression is achieved by only small dots 90 and medium dots 92 in a range of gradation level from 86 to 170; and the gradation expression is achieved by only medium dots 92 and large dots 93 or only the small dots 90 and the medium dots 92 in a range of gradation level from 171 to 255.

Although an ideal dot size is not always achieved depending on a performance of a head unit, it is possible to acquire a desired characteristic such as for example a characteristic in which brightness according to the gradation level becomes linear (brightness linear) by adjusting gradation section to which the dot size is applied as shown in FIGS. 9A and 9C. That is, when the minimum dot size is small, as shown in FIG. 9B, a range from a low-brightness to a high-brightness can be reproduced. When the minimum dot size is large, as shown in FIG. 9C, a range from a relatively high-brightness to a high-brightness can be reproduced.

Since the characteristic of the halftone process itself is reflected in the gradation expression with respect to a single color gradation expression of CMYK, an expanding process of gradation is not needed or a minimum expansion is sufficient when a single color is used. This is applied not only to the dot size modulation method but also to a brightness modulation method, which uses ink having brightness different from conventional ink, that is, light ink or dark ink. The object of use of the light ink or the dark ink is to improve granular feel of each color of CMYK and an amount of ink adhered, and, basically, there is no difference in expressing gradation by continuing on the same color phase of normal CMYK ink.

When only one color among CMYK is used or colors of the same color phase including light ink or dark ink are used, a processing speed can be increased while maintaining a gradation reproducibility by not performing a gradation expansion process or performing a minimum expansion.

Figure 10:
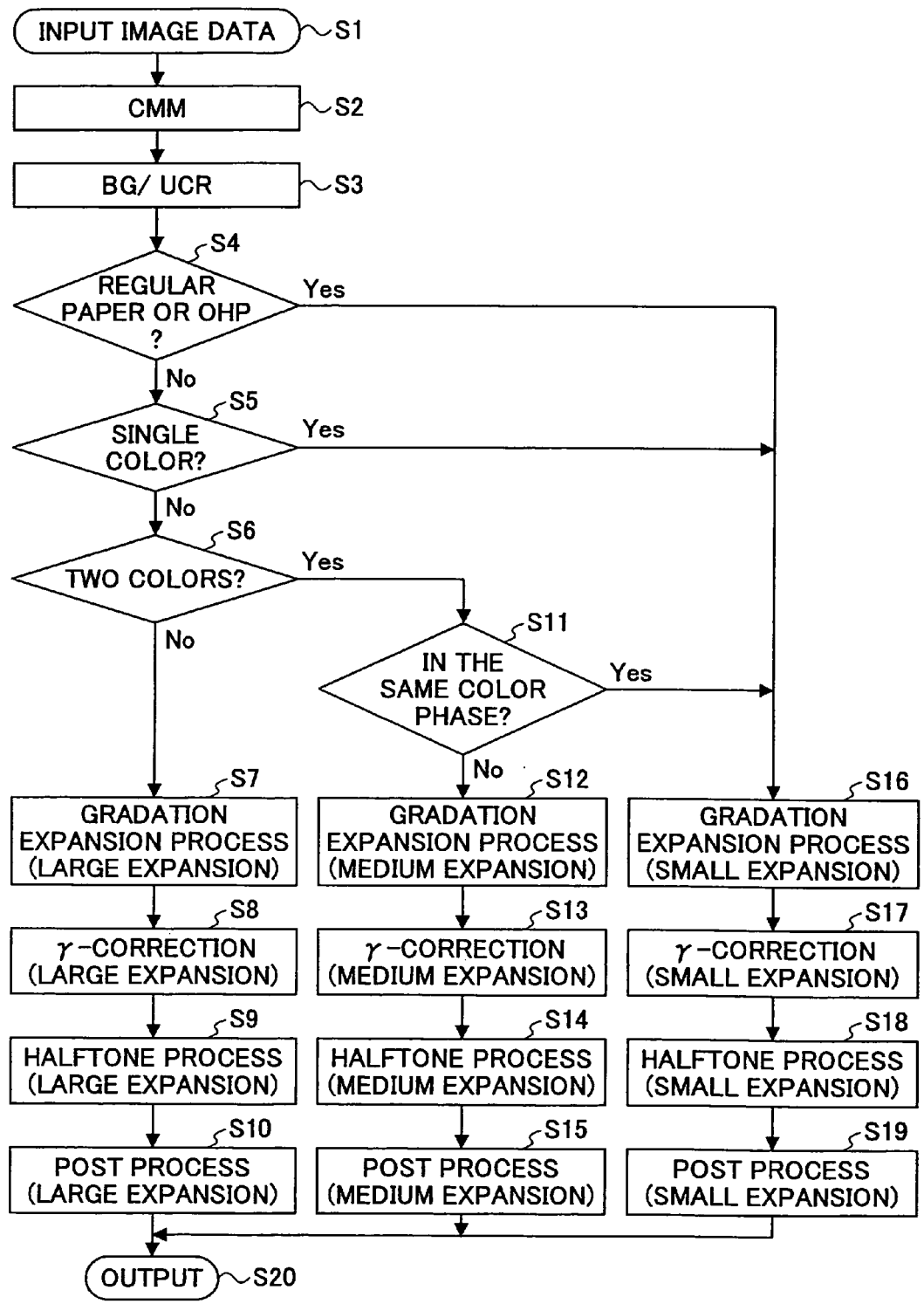
FIG. 10 is a flowchart of an image processing method according to the present invention.

A description will now be given, with reference FIG. 10, of an image processing method according to the present invention. FIG. 10 is a flowchart of an image processing method according to the present invention. In FIG. 10, input of image data (step S1), the CMM process (step S2) and BG/UCR process (step S3) are the same as that shown in FIG. 1. As a first election, it is determined, in step S4, whether or not a recording paper is a regular paper or an overhead projector (OHP) sheet. In this case, if the recording paper is neither a regular paper nor an OHP sheet (No of step S4), a coated print paper such sa a coated paper or a glossy paper is selected.

If it is determined, in step S4, that the recording paper is a regular paper or an OHP sheet, which provides a low effect of expansion of gradation (Yes of step S4), the routine proceeds to step S16 where a gradation expansion process of small expansion is performed. It should be noted that the process of step S16 includes that no expansion is performed.

Then, the routine is directed to one of step S7, step S12 and step S16 according to a number of colors of ink (a number of ink tanks (not shown in the figure)). In step S7, a gradation expansion process of large expansion is performed. In step S12, a gradation expansion process of medium expansion is performed. That is, if the recording paper is neither a regular paper nor an OHP sheet (No of step S4), the routine proceeds to step S5 where it is determined whether or not a single color is used. If only a single color is used (Yes of step S5), the routine proceeds to step S16. If a plurality of colors are used (No of step S5), the routine proceeds to step S6 where it is determined whether or not only two colors are used.

If only two colors are used (Yes of step S6), the routine proceeds to step S11 where it is determined whether or not the colors to be used are in the same color phase. On the other hand, if it is determined that three or more colors are used (No of step S6), the routine proceeds to step S7 where the gradation expansion process of large expansion is performed. If only two colors are used and the two colors are in the same color phase system (Yes of step S11), the routine proceeds to step S16 where the gradation expansion process of small expansion is performed. On the other hand, if only two colors are used but the two colors are not in the same color phase system (No of step S11), the routine proceeds to step S12 where the gradation expansion process of medium expansion is performed. That is, it is determined, in step S11, whether or not there are provided ink having the same color phase system but having higher brightness or lower brightness so as to direct the routine to the gradation expansion process of small expansion when there are two kinds of ink of the same color phase system.

After the selection of the process to be performed is completed, a γ-correction (steps S8, S13 and S17) and a halftone process (steps S9, S14 and S18) are applied to the image data, and, then, the processed image data is converted into dot data (quantization). It should be noted that since a Dither process is applied to the halftone process, the pixel data is discarded after quantization. However, if an error diffusion process is applied to the halftone process, a post process (steps S10, S15 and S19) are needed to return the image data once again to an original amount of information since an error in the operation of the quantization is reflected in an operation of a next pixel. It should be noted that the post process (step S10, S15 and S19) is unnecessary when an error diffusion process is not applied to the halftone process. The image data after the quantization is rearranged in accordance with a structure of the head and a print bus (not shown in the figure), and is sent to the head unit and an image is output, in step S20, from the head unit in accordance with the image data.

Figure 11:
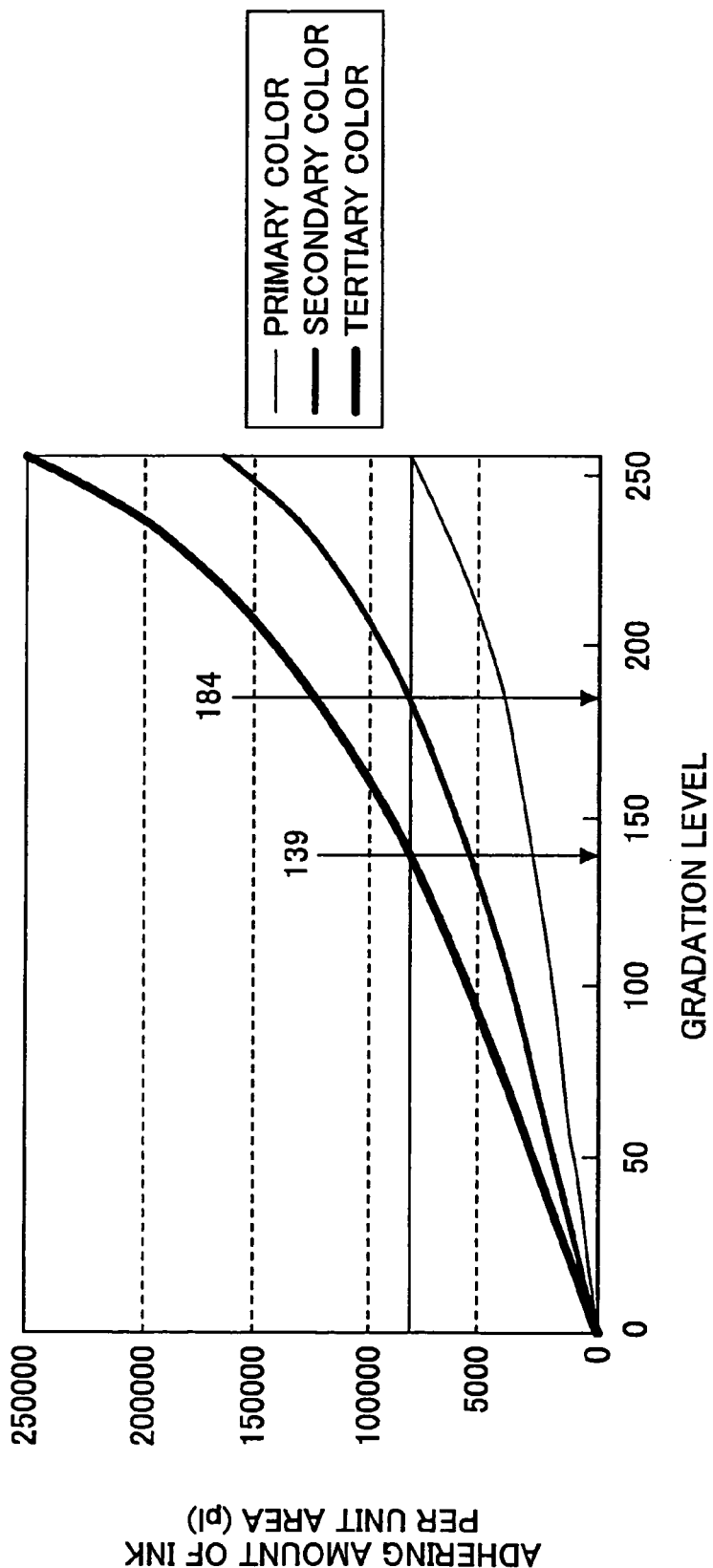
FIG. 11 is a graph showing a relationship between an amount of ink adhering on a recording paper and a gradation level for first, second and tertiary colors.

FIG. 11 is a graph showing a relationship between an amount of ink adhering on a recording paper and a gradation level for first, second and tertiary colors. In FIG. 11, a horizontal axis represents a gradation level and a vertical axis represents an amount of ink adhering in a unit area of a recording paper (hereinafter referred to as an adhesion amount of ink). Since FIG. 10 shows an adhering amount of ink under a condition of no restriction, the adhering amount of ink increases twice (200%) and three-times (300%) as the secondary color and the tertiary color are applied, respectively.

However, in practice, a restriction is normally applied to an adhering amount of ink since various problems may be caused in addition to a problem in that concentration is saturated if an excessive amount of ink adheres on a recording medium (recording paper, print paper, etc.). The various problems include a generation of bleeding or a spot like a liquid drop due to overflowing of ink which is not absorbed by the recording medium, and a contact of a head to a printed surface, which contaminates the printed surface, or causes a paper jam due to swelling of the recording medium.

For example, if an adhering amount of the primary color, which produces a solid image by the primary color ink, is set as a restriction value in FIG. 10, the secondary color is permitted to 184th gradation level and the tertiary color is permitted to 139th gradation level. This means that tertiary color can be expressed in gradation only a half of the primary color which can be expressed in gradation up to 255th gradation level. Thus, it is said that an expansion of gradation is necessary for the tertiary color.

Although the restriction value of an adhering amount of ink is set to 100% of a solid (daubed) image in single color in the example shown in FIG. 11, the restriction value may be changed in accordance with an inclination of the curve, which is changed by various factors such as matching of ink with a recording paper, a volume of an ink droplet, a recording resolution, an existence of drying means such as a heater, etc. However, with respect to numbers of expressible gradations of the first, second and tertiary colors, a relationship "a number of gradations of the primary color≧a number of gradations of the secondary color≧a number of gradations of the tertiary color" is maintained. Thus, when performing an expansion of gradation, the expansion should be applied that a relationship "a number of gradations of the primary color≦a number of gradations of the secondary color≦a number of gradations of the tertiary color" is established.

As mentioned above, the restriction value is influenced by various factors, and from among the factors, kinds of recording paper give a great influence to the restriction value. Since no special treatment such as for receiving ink is applied to a non-coated printer paper such as a regular paper (copy paper) popular in general offices, ink may run and wrinkles are easily formed due to a water component contained in ink. Thus, the restriction value is set to a relatively low value.

On the other hand, since coated print paper such as coated paper for IJ printer use, which is applied with an ink receiving treatment, has a costing layer to facilitate ink being fixed on the surface of the recording paper, the restriction value can be set to a value having a larger margin than that of a regular paper. Moreover, there is a special example such as an OHP sheet having a ink receiving layer on a plastic film. Since the plastic film as a base cannot absorb ink at all, an amount of ink exceeding an absorbing capacity of the ink receiving layer overflows. Thus, the restriction value must be a smaller value. However, the gradation reproducibility is not determined solely by the restriction value, and a resolution on a recording paper gives great influence to the gradation reproducibility. In the above-mentioned example, a regular paper and an OHP sheet are inferior to the coated paper in an ink receiving capacity, and also they are inferior to a coated paper with respect to a resolution.

For example, if a very small dot is formed on a regular paper, ink may runs along fibers of the regular paper, which makes the dot unclear. Thus, even if a number of gradations is expanded, the effect of the expansion cannot be fully exhibited. Moreover, it is assumed that the OHP sheet is used to enlarge and project an image on the OHP sheet by a projector having a low-luminance. Thus, a pattern in the OHP sheet is blurred due to diffusion and attenuation of light, which results in an image having extremely small dynamic range projected on a screen.

On the other hand, the reproducibility of dots is high and a small gradation change is recognizable in the coated paper even that the restriction value can be set to a high value. Thus, the coated paper requires an expansion of gradation rather than a regular paper or an OHP paper. This can be said for a glossy paper which can reproduce dots more clearly.

For the reasons above, it is a waste of a time to perform a gradation expansion on a recording paper having a low resolution, and a gradation expansion should be performed on a recording paper having a high-resolution. Thus, in the present invention, a rate of increase in a number of gradations is reduced when recording on a regular paper or an OHP sheet having a small effect of an expansion of a number of gradations so as to prevent an amount of information from being unnecessarily increased, which increases an operation load, thereby reducing a time spent on processing high-quality image data.

It should be noted that the above-mentioned process can be described by a program and is executed by a computer, or implemented by hardware, which is mounted on a printer. Additionally, such a program can be distributed to a remote place through a network, or distributed by a low-cost medium widely used as a computer recording media such as a flexible disk, a compact disk (CD), a digital versatile disk (DVD) or the like. Those recording media are suitable for long time storage, and are effective for program backup.

Although the IJ printer is described mainly in the above description, the present invention is not limited to the IJ printer and is applicable to a printer using other recording methods such as an electrophotography or a thermal transfer method.

As mentioned above, according to the embodiment of the present invention, a gradation pattern, wihch is to be cut off in accordance with an output characteristic of a recording apparatus, can be replenished by performing image processing by temporarily increasing a number of gradations to a number greater than that of input image data, which enables a smooth gradation expression. Additionally, an amount of information is prevented from being unnecessarily increased by adjusting a number of gradations to be increased in accordance with a number of colors used for each pixel, which prevents an increase in an operation load to a processor. Accordingly it is possible to reduce a time spent on processing high-quality image data.

Light ink, which is used for mainly suppressing a granular feel, and dark ink, which is used for mainly reducing an adhering amount of ink, are in the same color phase with a primary color as a base. Generally, in a design of image processing parameters, a gradation reproducibility of a primary color is maintained basically. Accordingly, when only a primary color is used, there is no advantage to expand a number of gradations for light ink or dark ink which may in the same color phase. Therefore, an amount of information is prevented from being unnecessarily increased by adjusting a number of gradations to be increased by lumping together colors in the same color phase system, which prevents an increase in an operation load to a processor. Accordingly it is possible to reduce a time spent on processing high-quality image data.

Generally, in a design of image processing parameters, a gradation reproducibility of a primary color and colors in the same color phase system is maintained basically. Accordingly, when only a primary color and colors in the same color phase system are used, there is no advantage to expand a number of gradations. Therefore, an amount of information is prevented from being unnecessarily increased by not performing an expansion of gradations when a primary color and colors in the same color phase system are used, which prevents an increase in an operation load to a processor. Accordingly it is possible to reduce a time spent on processing high-quality image data.

Since there may be a case where a dynamic range of reproducible gradation is extremely small due to dot blurring on a recording medium depending on a kind of recording medium, especially a regular paper, in which blurring tends to occur, there is a small effect of an expansion of gradation. Moreover, an image recorded on an OHP sheet forms an entirely wash-out image having a small dynamic range since it is enlarged and projected by an projector having a small amount of light. Accordingly, there is a small effect of an expansion of gradation for an image to be recording on the OHP sheet. On the contrary, an individual recording dot can be reproduced clearly on a coated paper or a glossy paper to which a recording agent receiving process has been applied, which increases the effect of an expansion of gradation. Therefore, when recording an image on a regular paper or an OHP sheet which has a small effect of an expansion of a number of gradations, an amount of information is prevented from being unnecessarily increased by reducing a rate of increase in a number of gradations to be increased, which prevents an increase in an operation load to a processor. Accordingly it is possible to reduce a time spent on processing high-quality image data.

By recording a program, which can perform the image processing method according to the present invention, on a low-cost recording medium, a large volume distribution and copy can be achieved. If it is a non-volatile memory, a long-term storage of such as program can be achieved. Furthermore, since recent computers are normally or optionally equipped with a recording medium reading device such as a flexible disk drive or a CD/DVD drive, the program recorded on such a recording medium can be easily installed in a computer.

The present invention is not limited to the specifically disclosed embodiments, and variations and modifications may be made without departing from the scope of the present invention.

The invention claimed is:

1. An image processing method for producing recording data from first image data corresponding to each pixel with a first number of gradations so as to supply the recording data to a recording apparatus, which expresses each pixel with a number of gradations smaller than the first number of gradations, the image processing method comprising:
   producing second image data by converting said first image data into a color space that can be output by said recording apparatus, the second image data having a second number of gradations;
   producing third image data based on the second number of gradations of the second image data so that the third image data has a third number of gradations; and
   producing said recording data by applying a halftone process to the third image data,
   wherein producing the third image data includes adjusting the third number of gradations of the third image data to be equal to or larger than the second number of gradations of the second image data in accordance with a number of colors for each pixel used in the second image data.

2. The image processing method as claimed in claim 1, wherein, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, producing the third image data includes adjusting the third number of gradations of the third image data so as to satisfy a relationship "a number of gradations of the primary color≦a number of gradations of the secondary color≦a number of gradations of the tertiary color".

3. The image processing method as claimed in claim 2, wherein when the primary color is used in the second image data, producing the third image data does not increase the third number of gradations so that the second number of gradations of the second image data is equal to the third number of gradations of the third image data.

4. The image processing method as claimed in claim 1, wherein, when colors used in the second image data are in a one-color phase system having different brightness, when the colors used in the second image data are in a two-color phase system, and when the colors used in the second image data are in a three-color phase system, producing the third image data includes adjusting the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system".

5. The image processing method as claimed in claim 4, wherein when the colors in the one-color phase system are used in the second image data, producing the third image data does not increase the third number of gradations so that the second number of gradations of the second image data is equal to the third number of gradations of the third image data.

6. The image processing method as claimed in claim 1, wherein producing the third image data includes adjusting a rate of increase in the third number of gradations in accordance with kinds of recording media on which the third image data is recorded.

7. The image processing method as claimed in claim 6, wherein producing the third image data includes adjusting a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

8. A recording medium storing a program for causing a computer to perform an image processing method for producing recording data from first image data corresponding to each pixel with a first number of gradations so as to supply the recording data to a recording apparatus, which expresses each pixel with a number of gradations smaller than the first number of gradations, the image processing method comprising:
producing second image data by converting said first image data into a color space that can be output by said recording apparatus, the second image data having a second number of gradations;
producing third image data based on the second number of gradations of the second image data so that the third image data has a third number of gradations; and
producing said recording data by applying a halftone process to the third image data,
wherein producing the third image data includes adjusting the third number of gradations of the third image data to be equal to or larger than the second number of gradations of the second image data in accordance with a number of colors for each pixel used in the second image data.

9. The recording medium as claimed in claim 8, wherein, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, producing the third image data includes adjusting the third number of gradations of the third image data so as to satisfy a relationship "a number of gradations of the primary color≦a number of gradations of the secondary color≦a number of gradations of the tertiary color".

10. The recording medium as claimed in claim 9, wherein when the primary color is used in the second image data, producing the third image data does not increase the third number of gradations so that the second number of gradations of the second image data is equal to the third number of gradations of the third image data.

11. The recording medium as claimed in claim 8, wherein, when colors used in the second image data are in a one-color phase system having different brightness, when the colors used in the second image data are in a two-color phase system, and when the colors used in the second image data are in a three-color phase system, producing the third image data includes adjusting the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system".

12. The recording medium as claimed in claim 11, wherein when the colors in the one-color phase system are used in the second image data, producing the third image data does not increase the third number of gradations so that the second number of gradations of the second image data is equal to the third number of gradations of the third image data.

13. The recording medium as claimed in claim 8, wherein producing the third image data includes adjusting a rate of increase in the third number of gradations in accordance with kinds of recording media on which the third image data is recorded.

14. The recording medium as claimed in claim 13, wherein producing the third image data includes adjusting a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

15. An image forming apparatus for producing recording data from first image data corresponding to each pixel with a first number of gradations so as to supply the recording data to a recording part, which expresses each pixel with a number of gradations smaller than the first number of gradations, the image forming apparatus comprising:
control means for producing second image data by converting said first image data into a color space that can be output by said recording apparatus, the second image data having a second number of gradations;

producing third image data based on the second number of gradations of the second image data so that the third image data has a third number of gradations; and producing said recording data by applying a halftone process to the third image data, wherein said control means adjusts the third number of gradations of the third image data to be equal to or larger than the second number of gradations of the second image data in accordance with a number of colors for each pixel used in the second image data.

16. The image forming apparatus as claimed in claim 15, wherein, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, said control means adjusts the third number of gradations of the third image data so as to satisfy a relationship "a number of gradations of the primary color≦a number of gradations of the secondary color≦a number of gradations of the tertiary color".

17. The image forming apparatus as claimed in claim 16, wherein when the primary color is used in the second image data, said control means does not increase the third number of gradations so that the second number of gradations of the second image data is equal to the third number of gradations of the third image data.

18. The image forming apparatus as claimed in claim 15, wherein, when colors used in the second image data are in a one-color phase system having different brightness, when the colors used in the second image data are in a two-color phase system, and when the colors used in the second image data are in a three-color phase system, said control means adjusts the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system".

19. The image forming apparatus as claimed in claim 18, wherein when the colors in the one-color phase system are used in the second image data, said control means does not increase the third number of gradations so that the second number of gradations of the second image data is equal to the third number of gradations of the third image data.

20. The image forming apparatus as claimed in claim 15, wherein said control means adjusts a rate of increase in the third number of gradations in accordance with kinds of recording media on which the third image data is recorded.

21. The image forming apparatus as claimed in claim 20, wherein said control means adjusts a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

22. The image forming apparatus as claimed in claim 15, wherein said control means performs a zooming process and a halftone process.

23. An image forming system comprising:

an image processing apparatus that produces recording data from first image data corresponding to each pixel with a first number of gradations so as to supply the recording data to a recording part, which expresses each pixel with a number of gradations smaller than the first number of gradations;

an image forming apparatus that performs a zooming process and a halftone process to the recording data supplied by said image processing apparatus so as to produce an image corresponding to the recording data; and control means for producing second image data by converting said first image data into a color space that can be output by said recording apparatus, the second image data having a second number of gradations; producing third image data based on the second number of gradations of the second image data so that the third image data has a third number of gradations; and producing said recording data by applying a halftone process to the third image data, wherein said control means adjusts the third number of gradations of the third image data to be equal to or larger than the second number of gradations of the second image data in accordance with a number of colors for each pixel used in the second image data.

24. The image forming system as claimed in claim 23, wherein, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, said control means adjusts the third number of gradations of the third image data so as to satisfy a relationship "a number of gradations of the primary color≦a number of gradations of the secondary color≦a number of gradations of the tertiary color".

25. The image forming system as claimed in claim 24, wherein when the primary color is used in the second image data, said control means does not increase the third number of gradations so that the second number of gradations of the second image data is equal to the third number of gradations of the third image data.

26. The image forming system as claimed in claim 23, wherein, when colors used in the second image data are in a one-color phase system having different brightness, when the colors used in the second image data are in a two-color phase system, and when the colors used in the second image data are in a three-color phase system, said control means adjusts the third number of gradations of the third image data by increasing the third number of gradations so as to satisfy a relationship "a number of gradations of a color in the one-color phase system≦a number of gradations of a color in the two-color phase system≦a number of gradations of a color in the three-color phase system".

27. The image forming system as claimed in claim 26, wherein when the colors in the one-color phase system are used in the second image data, said control means does not increase the third number of gradations so that the second number of gradations of the second image data is equal to the third number of gradations of the third image data.

28. The image forming system as claimed in claim 23, wherein said control means adjusts a rate of increase in the third number of gradations in accordance with kinds of recording media on which the third image data is recorded.

29. The image forming system as claimed in claim 28, wherein said control means adjusts a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

30. A program for causing a computer to perform an image processing method for producing recording data from first image data corresponding to each pixel with a first number of gradations so as to supply the recording data to a recording apparatus, which expresses each pixel with a number of gradations smaller than the first number of gradations, the image processing method comprising:
    producing second image data by converting said first image data into a color space that can be output by said recording apparatus, the second image data having a second number of gradations;
    producing third image data based on the second number of gradations of the second image data so that the third image data has a third number of gradations; and
    producing said recording data by applying a halftone process to the third image data,
    wherein producing the third image data includes adjusting the third number of gradations of the third image data to be equal to or larger than the second number of gradations of the second image data in accordance with a number of colors for each pixel used in the second image data.

31. The program as claimed in claim 30, wherein, when the second image data is produced using only a primary color that is one of cyan, magenta, yellow and black, when the second image data is produced using a secondary color that is a mixture of only two of the cyan, the magenta, the yellow and the black, and when the second image data is produced using a tertiary color that is a mixture of three of the cyan, the magenta, the yellow and the black, producing the third image data includes adjusting the third number of gradations of the third image data so as to satisfy a relationship "a number of gradations of the primary color$\leqq$a number of gradations of the secondary color$\leqq$a number of gradations of the tertiary color".

32. The program as claimed in claim 31, wherein when the primary color is used in the second image data, producing the third image data does not increase the third number of gradations so that the second number of gradations of the second image data is equal to the third number of gradations of the third image data.

33. The program as claimed in claim 30, wherein, when colors used in the second image data are in a one-color phase system having different brightness, when the colors used in the second image data are in a two-color phase system, and when the colors used in the second image data are in a three-color phase system, producing the third image data includes adjusting the third number of gradations of the third image data by increasing the third number of gradations so as to satisfy a relationship "a number of gradations of a color in the one-color phase system$\leqq$a number of gradations of a color in the two-color phase system$\leqq$a number of gradations of a color in the three-color phase system".

34. The program as claimed in claim 33, wherein when the colors in the one-color phase system are used in the second image data, producing the third image data does not increase the third number of gradations so that the second number of gradations of the second image data is equal to the third number of gradations of the third image data.

35. The program as claimed in claim 30, wherein producing the third image data includes adjusting a rate of increase in the third number of gradations in accordance with kinds of recording media on which the third image data is recorded.

36. The program as claimed in claim 35, wherein producing the third image data includes adjusting a rate of increase in the third number of gradations so that the rate of increase in the third number of gradation when recording is performed on a coated print paper is larger than the rate of increase in the third number of gradations when recording is performed on other print papers including a non-coated print paper and a projector sheet, the coated print paper being applied with a recording agent receiving treatment including a coating treatment on a surface onto which a recording agent including ink and a toner is adhered.

* * * * *